April 15, 1941.    M. R. HUTCHISON, JR    2,238,491
CAMERA SHUTTER
Filed Jan. 5, 1940

MILLER R. HUTCHISON, JR.
INVENTOR

BY
ATTORNEYS

Patented Apr. 15, 1941

2,238,491

UNITED STATES PATENT OFFICE 2,238,491

CAMERA SHUTTER

Miller R. Hutchison, Jr., Rochester, N. Y., assignor to Eastman Kodak Company, Rochester, N. Y., a corporation of New Jersey Application January 5, 1940, Serial No. 312,561

5 Claims. (Cl. 95—60)

This invention relates to photography and more particularly to a simple type of shutter for cameras.

One object of my invention is to provide a shutter which consists of only a few parts which are simple to assemble and easy to make. Another object of my invention is to provide a simple type of shutter in which the shutter trigger is moved always in the same direction to make an exposure. Another object of my invention is to provide a shutter which will have a single speed of approximately $\frac{1}{25}$ of a second. Other objects will appear from the following specification, the novel features being particularly pointed out in the claims at the end thereof.

In the drawing, in which like reference characters denote like parts throughout:

Figure 1:
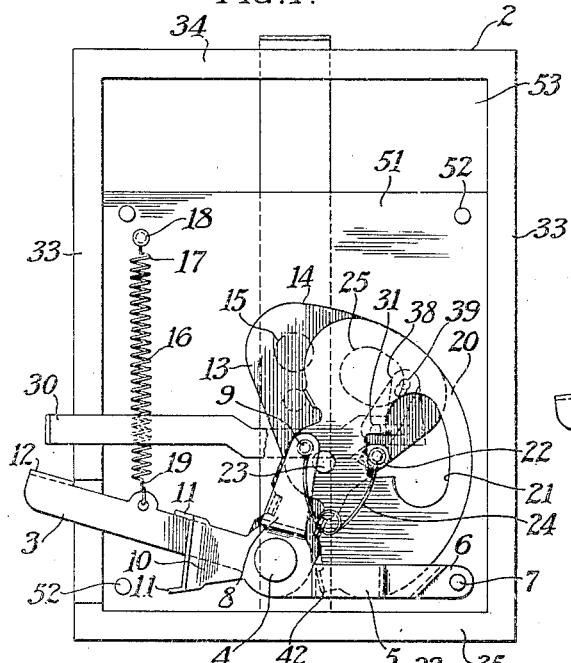
Fig. 1 is a front plan view of a camera equipped with a shutter showing a preferred embodiment of my invention, the front plate of the camera being removed to disclose the shutter mechanism.

As my improved shutter is particularly adapted for use on simple types of box cameras, I have shown a preferred embodiment as being mounted on the front board of a box camera 2, upon a plate 51 attached to a block 53 by brads 52 and pins 18 and 7. The shutter trigger 3 is pivotally mounted on a stud 4, carried by a bracket 5. The bracket has one arm 6 attached to the front board by a pin 7 and has a second arm 8 carrying a stud 9 which passes downwardly toward plate 51. The arm 8 is formed upwardly and extends over the cover blind and shutter blade.

The bracket 5 is also provided with a third arm 10, having downwardly extending flanges 11 which serve to limit the motion of the shutter trigger 3 in both directions about its pivot 4. The shutter trigger 3 is preferably provided with a handle 12 which is formed over to provide a satisfactory finger grip.

The shutter trigger 3 is integrally connected with the cover blind 13 so that the trigger and cover blind form, in effect, an L-shaped lever having an enlarged end 14 which is adapted to swing across an exposure aperture 15 which passes completely through the front wall 1 of the camera, so that light rays may pass from an objective to the film.

The cover blind 13 is normally held in the position of rest shown in Fig. 1, by means of a spring 16 which may be attached at one end 17 to a pin 18, carried by the front board 1 and may be attached at the opposite end 19 to the shutter trigger 3.

The shutter blade 20 consists of a plate, having an arcuate outer edge and including an exposure opening 21, there being a lug 22 formed along one edge of this opening. The shutter blade is pivoted upon a stud 23 which is carried directly upon the cover blind 13. Consequently, when the trigger 3 is moved, the cover blind 13 is moved, this movement also swinging the shutter blade pivot 23 so that this pivot may swing past the fixed pin 9, which carries one end of a hairpin spring 24, the opposite end of which is attached to the stud 22.

Thus, the movement of the cover blind will cause the pins 9 and 23 to swing past each other, and this movement will tension and release the hairpin spring 24, causing the shutter blade 20 to swing first in one direction and then in the other according to the direction of movement of the cover blind 13.

Figure 3:
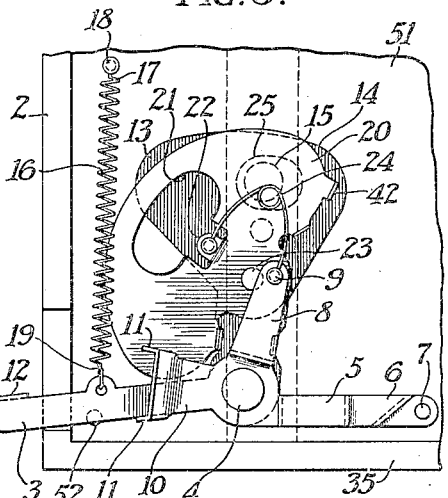
Fig. 3 is a fragmentary view similar to Fig. 2, but with the shutter parts shown just after an exposure has been made.
Figure 2:
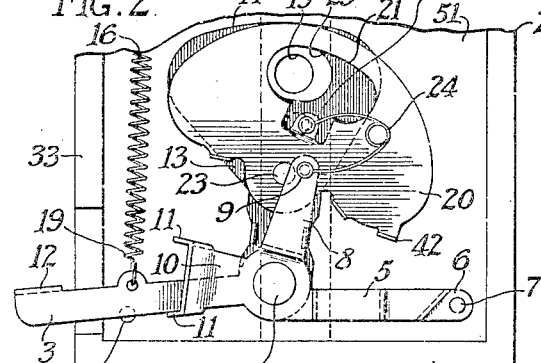
Fig. 2 is a fragmentary view similar to Fig. 1, but with the shutter parts shown in the position they assume in making an exposure.

Referring to Fig. 1, which shows the parts in a normal position of rest, when the trigger 3 is depressed to make an exposure, the cover blind will be moved until an opening 25 in the cover blind is brought opposite the exposure opening 15. During this movement of the cover blind 13, the pivot 23 of the shutter blade 20 has been swung until it passes the fixed pin 9, carried by the bracket 5. This causes the hairpin spring 24 to actuate the shutter, and, in the position shown in Fig. 2, the shutter blade 20 has just uncovered the exposure aperture 15. Further movement of the trigger 3 to the position shown in Fig. 3 causes a continuation of this movement of the shutter blade until the exposure aperture 15 has been completely covered, as shown in this figure.

Figure 4:
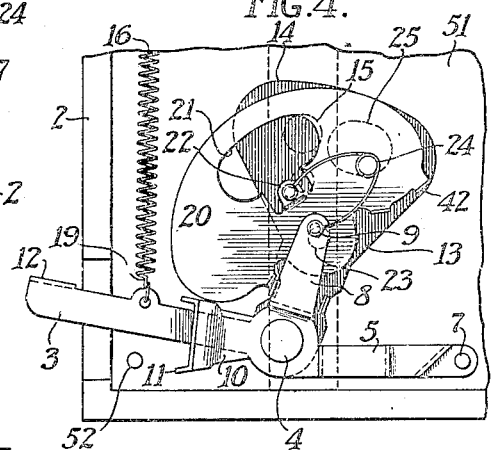
Fig. 4 is a view similar to the preceding figures, with the shutter parts returning to their normal position of rest.

After the exposure has been completed and the trigger is released, the spring 16 returns the parts to the position shown in Fig. 1. However, the exposure opening 15 is not, during this movement, again opened for the passage of light, because the trigger 3 moves upwardly carrying the cover blind 13 into a position in which its opening 25 does not register with the opening 15 before the shutter blade 20 is swung about its pivot 23. This is illustrated in Fig. 4, where the shutter blind is shown as being almost back to its original position without the shutter blade having yet been moved by the hairpin spring 24. However, in Fig. 4, the hairpin spring is about to be tensioned and released because the pivot 23 is about to swing past the fixed stud 9, thus, by passing the dead center, causing the spring 24 to again actuate the shutter blade.

It is, therefore, apparent that it is only when the trigger 3 is depressed that the openings 15, 25 and 21 are all in alignment, so that light may pass through to the film.

While it forms no part of the present invention, it is my intention to provide a mechanism by which prolonged exposures may be obtained. In this instance, the prolonged exposure is in the nature of a "bulb" exposure, that is, the trigger is depressed to open the shutter and is released to close the shutter.

Figure 5:
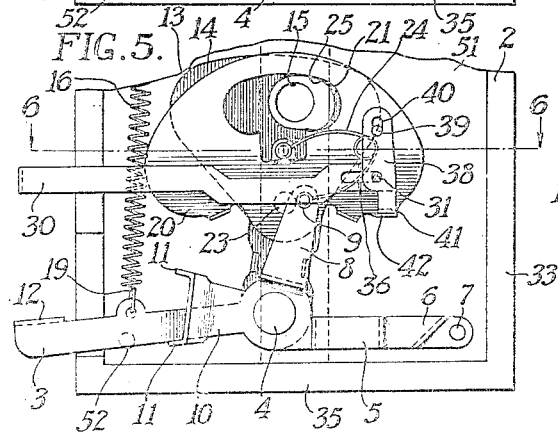
Fig. 5 is a view similar to the preceding figures, but with the parts in position for a prolonged exposure.
Figure 6:
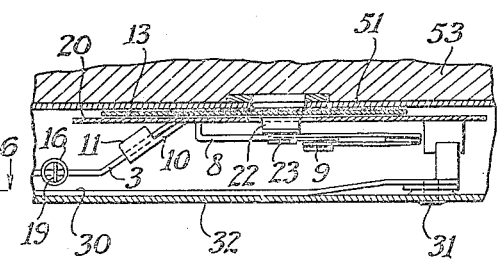
Fig. 6 is a fragmentary sectional view taken on line 6—6 of Fig. 5.

This operation takes place when a time lever 30 is moved outwardly into the position shown in Fig. 5. It will be noticed that the time lever 30 is slidably mounted on a stud 31, carried by the shutter cover plate 32, which lies over the front plate 1 and rests on the side walls 33 and the top and bottom walls 34 and 35 of the camera box.

When the lever 30 is drawn out, the slotted end 36 moves about the stud 31. This movement causes an upstanding end of the lever, which is L-shaped and which is not shown in the drawing because it lies behind a second lever 38, to move with the lever 30. The L-shaped end or upstanding end of the lever 30, carries a pin 39 which engages a slot 40 of the lever 37, which is pivoted upon the pin 31. Thus, when the lever 30 is drawn out, the lever 38 is rocked about the pivot 31 until the lug 41 is brought into the path of a lug 42, carried on the shutter blade. Consequently, the shutter blade is unable to complete its movement under the impulse of the tensioned and released shutter spring 24 and the parts will stop with the exposure opening 15 completely opened so that an exposure can continue as long as the trigger 3 is held in a depressed position. When the trigger is released, the spring 16 will restore the parts to the position shown in Fig. 1. If, then, the lever 30 is thrust downwardly, the lug 41 of the lever 37 will be swung about the pivot 31 and out of the path of the shutter blade lug 42. The shutter will then be ready for instantaneous exposures.

What I claim is:

1. In a camera shutter, the combination with an exposure opening, of a cover blind pivotally mounted to cover and uncover the opening, a stud carried by the cover blind, a shutter blade pivotally mounted on the stud and including an exposure aperture, a hairpin spring connected to the shutter blade at one end, a fixedly mounted stud supporting the other end of the spring, a trigger for operating the cover blind and for moving the shutter blade relative to the fixed stud spring support until the hairpin spring is tensioned and released whereby the shutter blade may swing on the stud carried by the cover blind and an exposure may be made through said exposure aperture.

2. In a camera shutter, the combination with an exposure opening, of a cover blind pivotally mounted adjacent the opening, a trigger for moving said cover blind upon its pivot to a position to uncover the exposure opening, a shutter blade including an exposure aperture pivotally mounted on the cover blind radially of the cover blind pivot, a fixed stud; a hairpin spring connecting the shutter blade to the fixed stud, said fixed study being located near the path of travel of the shutter pivot whereby said spring may be tensioned and released by moving the cover blind in one direction to uncover the exposure aperture whereby an exposure may be made by the exposure aperture in the shutter leaf when said cover blind has uncovered the exposure aperture.

3. In a camera shutter, the combination with an exposure opening, of a cover blind pivotally mounted adjacent the opening, a trigger for moving said cover blind upon its pivot to a position to uncover the exposure opening, a shutter blade including an exposure aperture pivotally mounted on the cover blind radially of the cover blind pivot, a fixed stud; a hairpin spring connecting the shutter blade to the fixed stud, said fixed stud being located near the path of travel of the shutter pivot whereby said spring may be tensioned and released by movement of the cover blind in both directions, an exposure being made only when said shutter blade with its exposure aperture is operated by movement of the cover blind to uncover the exposure aperture, and a spring for returning the cover blind from the exposure aperture uncovering position to a position covering the exposure aperture.

4. In a camera shutter, the combination with an exposure opening, of a cover blind pivotally mounted adjacent the opening, a trigger for moving said cover blind upon its pivot to a position to uncover the exposure opening, comprising a trigger operably connected to the cover blind, a spring holding the cover blind in a normal operative position covering the exposure opening, a pivot carried by the cover blind spaced from the pivotal mount of the cover plate, and adapted to move with the cover blind through an arcuate path, a shutter leaf moveably carried by said pivot carried by the cover blind, a fixed stud mounted adjacent the arcuate path of the shutter blade pivot, a hairpin spring connecting the fixed stud and shutter blade and positioned to be tensioned and released by moving the shutter blade pivot past the fixed stud carrying one end of the hairpin spring, whereby an exposure may be made by moving the cover blind to an inoperative exposure aperture uncovering position by operating the trigger.

5. In a camera shutter, the combination with an exposure opening, of a cover blind pivotally mounted adjacent the opening, a trigger for moving said cover blind upon its pivot to a position to uncover the exposure opening, comprising a trigger operably connected to the cover blind, a spring holding the cover blind in a normal operative position covering the exposure opening, a pivot carried by the cover blind spaced from the pivotal mount of the cover plate, and adapted to move with the cover blind through an arcuate path, a shutter leaf moveably carried by said pivot carried by the cover blind, a fixed stud mounted adjacent the arcuate path of the shutter blade pivot, a hairpin spring connecting the fixed stud and shutter blade and positioned to be tensioned and released by moving the shutter blade pivot past the fixed stud carrying one end of the hairpin spring, whereby an exposure may be made by moving the cover blind to an inoperative exposure aperture uncovering position by operating the trigger, said cover blind spring being adapted to return the cover plate to its normal position after said trigger is released whereby the shutter blade may be operated after said cover blind has moved from the aperture covering position.

MILLER R. HUTCHISON, Jr.